(12) United States Patent
Donaldson et al.

(10) Patent No.: US 10,313,780 B2
(45) Date of Patent: Jun. 4, 2019

(54) EARPHONE CONNECTION APPARATUS

(71) Applicant: SOUNDCHIP SA, Aran-Villette (CH)

(72) Inventors: Mark Donaldson, Aran-Villette (CH);
Amit Naran, Aran-Villette (CH);
Robert Beck, Aran-Villette (CH)

(73) Assignee: SOUNDCHIP SA, Aran-Villette (CH)

( * ) Notice: Subject to any disclaimer, the term of this patent is extended or adjusted under 35 U.S.C. 154(b) by 0 days.

(21) Appl. No.: 15/920,828

(22) Filed: Mar. 14, 2018

(65) Prior Publication Data
US 2018/0270563 A1    Sep. 20, 2018

(30) Foreign Application Priority Data

Mar. 14, 2017 (GB) .................... 1704067.6

(51) Int. Cl.
*H04R 3/00* (2006.01)
*G10K 11/16* (2006.01)
*H04R 1/10* (2006.01)
*G10K 11/178* (2006.01)
(Continued)

(52) U.S. Cl.
CPC ......... *H04R 1/1041* (2013.01); *G10K 11/178* (2013.01); *H04L 63/0876* (2013.01); *H04R 27/00* (2013.01); *G10K 2210/1081* (2013.01); *G10K 2210/3011* (2013.01); *H04L 63/0236* (2013.01); *H04R 1/1025* (2013.01); *H04R 1/1083* (2013.01); *H04R 2420/05* (2013.01);
(Continued)

(58) Field of Classification Search
CPC .. H04R 1/1025; H04R 1/1041; H04R 1/1083; H04R 3/00; H04R 5/04; H04R 2420/03; H04R 2420/05; H04R 2420/09; H04R 2460/01; H04R 27/00; G10K 11/178; G10K 2210/1081; G10K 2210/3011; H04L 63/0876; H04L 63/0236
See application file for complete search history.

(56) References Cited

U.S. PATENT DOCUMENTS 5,617,331 A  *  4/1997  Wakai ................. H04H 20/62
                                                        348/E7.049
6,988,905 B2 *  1/2006  Corey ................ H01R 13/665
                                                        381/74
2004/0039856 A1   2/2004  Ma et al.
(Continued)

FOREIGN PATENT DOCUMENTS

EP    1313350    5/2003
EP    3007464    4/2016
GB    2502983    12/2013

OTHER PUBLICATIONS

European Search Report issued in corresponding U.K. Patent Application No. GB1803572.5, dated Aug. 14, 2018, 3 pages.

*Primary Examiner* — Thang V Tran
(74) *Attorney, Agent, or Firm* — Lempia Summerfield Katz LLC

(57) ABSTRACT

Apparatus for connecting both analogue and digital earphone devices to a server system providing a digital audio output includes an interface for connecting an earphone device to the server system, a detector for detecting the type of earphone device connected via the interface, a converter for generating an analogue audio signal from the digital audio output received from the server system, and a switch for switching between providing digital and analogue signals to the attached earphone device via the interface.

10 Claims, 4 Drawing Sheets

(51) Int. Cl.
*H04L 29/06* (2006.01)
*H04R 27/00* (2006.01)

(52) U.S. Cl.
CPC ...... *H04R 2420/09* (2013.01); *H04R 2460/01* (2013.01)

(56) References Cited

U.S. PATENT DOCUMENTS

| | | | | |
|---|---|---|---|---|
| 2007/0098184 A1* | 5/2007 | Ibe | ............ | H04R 5/04 381/77 |
| 2008/0130911 A1* | 6/2008 | Tsen | ............ | H04R 5/04 381/74 |
| 2010/0086144 A1* | 4/2010 | Sibbald | ............ | H04M 1/6066 381/71.6 |
| 2014/0376734 A1* | 12/2014 | Lan | ............ | H04R 1/1025 381/71.6 |
| 2015/0055785 A1* | 2/2015 | Donaldson | ............ | H04R 1/1083 381/58 |
| 2015/0161979 A1* | 6/2015 | Li | ............ | H04R 1/1041 381/71.6 |
| 2015/0289055 A1* | 10/2015 | Li | ............ | H04R 3/002 381/71.6 |
| 2016/0157008 A1* | 6/2016 | Zhang | ............ | H04R 5/04 381/74 |
| 2018/0217809 A1* | 8/2018 | Yu | ............ | G06F 3/16 |

\* cited by examiner

POWER ———< VBUS

DATA / AUDIO ———< D+ / D-

MIC ———< RX+ / RX-

AUDIO RTN ———< SBU1 /SBU2

GROUND ———< GND

DETECT ———< CC1 / CC2

Fig. 7

EARPHONE CONNECTION APPARATUS

This application claims the benefit of U.K. Application No. GB 1704067.6, filed on Mar. 14, 2017, which is hereby incorporated by reference in its entirety.

FIELD

The present invention relates to apparatus for connecting earphone devices to a server system providing a digital audio output, and particularly but not exclusively to apparatus for connecting conventional analogue aviation headphones, including powered and non-powered active noise-cancelling headphones, as well as digital headsets to an aircraft In-Flight Entertainment and Communications (IFEC) server system.

BACKGROUND

Modern aircraft commonly contain IFEC systems for providing media to passengers. The audio component of this media is supplied to passenger headphones via a Remote Jack Unit (RJU) typically installed in the armrest of an aircraft seat.

An RJU typically supports one or more of the following headphone configurations commonly used on aircraft: 1) conventional analogue headphones; 2) powered noise-cancelling headphones; and 3) non-powered active noise-cancelling headphones. Each of these headphone configurations is typically connected via one or more 3.5 mm and/or 2.5 mm diameter plugs with a layout defined by an ARINC (Aeronautical Radio Incorporated) standard.

With the introduction of digital audio to IFEC systems, it has been proposed to add support for connecting digital headsets to an RJU. One proposed solution is a jack that supports digital audio, but can also detect the presence of a conventional analogue headphone and output an analogue audio signal instead.

SUMMARY AND DESCRIPTION

The present applicant has identified the need for an improved RJU that provides a means to transfer digital audio data from an IFEC to a digital headset and to provide analogue audio signals to conventional analogue headphones, but in addition to this, can operate with all other known analogue ARINC-type aviation headphones, including both powered and non-powered active noise-cancelling headphones.

In accordance with the present invention, there is provided apparatus (e.g. a Remote Jack Unit (RJU)) for connecting both analogue and digital earphone devices to server system providing a digital audio output (e.g. an aircraft IFEC server system), the apparatus comprising: an interface (e.g. electro-mechanical interface) for connecting an earphone device to the server system; a detector for detecting (e.g. via the interface) the type of earphone device connected via the interface. The apparatus may further comprise a converter for generating an analogue audio signal from the digital audio output (e.g. digital IFEC data) received from the server system; and a switch for switching between providing digital and analogue signals to the attached earphone device via the interface.

In one embodiment, the earphone device comprises a connection cable with a connector on the end of the cable for electrically connecting the earphone device to the server system via the interface.

In one embodiment, the earphone device comprises at least one circumaural or supra-aural earphone of the type used in headphones or at least one in-ear or in-the-canal earphone. In one embodiment, each earphone device comprises a pair (e.g. stereo pair) of earphones. In one embodiment the pair of earphones are connected by a headband to form a pair of headphones.

In one embodiment, the apparatus further comprises at least one of: a power supply for (e.g. selectively) providing power (e.g. via the interface) to an earphone device when connected via the interface; and a noise-cancellation module for providing noise-cancellation features (e.g. via the interface) to an earphone device when connected via the interface.

In one embodiment, the interface comprises a single connector (e.g. electrical connector) operative to handle a plurality of signals. For example, the connector may be configured to provide two or more of the following signals: analogue audio; digital audio data; power; microphone input signal; earphone detection signal. The signals may be switched and multiplexed to reduce the number of electrical contacts required.

In one embodiment, the detector is configured to detect the type of earphone device by monitoring a connection (e.g. audio and/or data connection) to the earphone device. In one embodiment, the detector is configured to detect a digital signal over the connection. In one embodiment, the detector is configured to measure an impedance of the a signal line of the connection (e.g. audio or microphone line).

In another embodiment, the detector is configured to detect the type of earphone device by measuring (e.g. via the interface) an (e.g. electrical) attribute of the earphone device when connected to the apparatus via the interface. For example, the earphone type may be detected based on measuring a circuit component embedded within an earphone part of the earphone device or its connection cable.

In one embodiment, the apparatus is configured to generate analogue audio signals from the digital audio output supplied by the server system. These signals are required when any analogue headphone, which will not be able to process digital data, is detected.

In one embodiment, the apparatus is configured to switch between providing: 1) digital data; and 2) analogue audio signals to the headphones.

In the case of apparatus comprising a power supply, the apparatus may be configured to connect the power supply to a connected earphone device when an earphone device requiring power (e.g. non-powered active noise-cancelling earphone device) is detected. In one embodiment, the apparatus may be configured to adjust the power supplied to a connected earphone device (e.g. adjust the supplied voltage) to suit the detected type of earphone device.

In the case of apparatus comprising a noise-cancelling module, the apparatus may be configured to enable the noise-cancelling module when a non-powered active noise-cancelling earphone device is detected. In one embodiment, the apparatus is configured to implement a plurality of different noise-cancelling arrangements. In one embodiment, the apparatus is configured to implement a noise cancelling arrangement based upon the detected type of earphone device.

In one embodiment, the apparatus further comprises a network security module (e.g. firewall) operative to allow only trusted digital earphone devices to connect with the server system.

In accordance with a further aspect of the present invention, there is provided an in-flight entertainment and communications (IFEC) system (e.g. for providing media content/communications data to a plurality of devices) comprising apparatus (e.g. an RJU) in accordance with any embodiment of the first aspect of the invention.

Various embodiments of the invention are possible. The following description is an example only, and not intended to limit the scope of the invention.

BRIEF DESCRIPTION OF THE DRAWINGS

An embodiment of the present invention will now be described by way of example with reference to the accompanying drawings in which:

FIG. 7 is a schematic illustration of a USB-C connector, as one possible headphone connector for the present invention.

DETAILED DESCRIPTION

Figure 1:
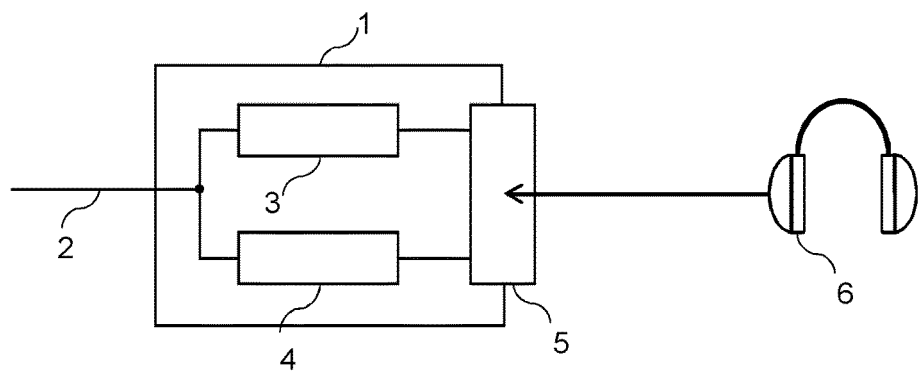
FIG. 1 is a block diagram of a jack apparatus in accordance with an embodiment of the present invention.

FIG. 1 shows a RJU 1 for mounting in an armrest of a passenger's seat or in another position in the vicinity of the passenger's seat on board an aircraft. RJU 1 comprises: a connection 2 to an In-Flight Entertainment and Communications (IFEC) system on the aircraft; a headphone connector 5 through which a passenger may connect headphones 6; headphone power supply 3 to provide power to the headphones when required; and headphone detection/output control module 4 to detect the headphone type and provide the appropriate signals to the headphones.

The headphone connector 5 contains multiple contacts to provide power, audio output, data, microphone input, and detection features. These contacts are turned on or off based on the requirements of the connected headphone. Contacts may be multiplexed to reduce the number of connector pins required. For example, the data and audio output lines are not used at the same time, and can therefore share the same connector contacts.

The headphone power supply 3 can be enabled or disabled, and may supply different voltages based on the requirements of the connected headphone. Powered noise-cancelling headphones require a nominal 12V supply, whereas digital headsets typically require 5V.

Figure 2:
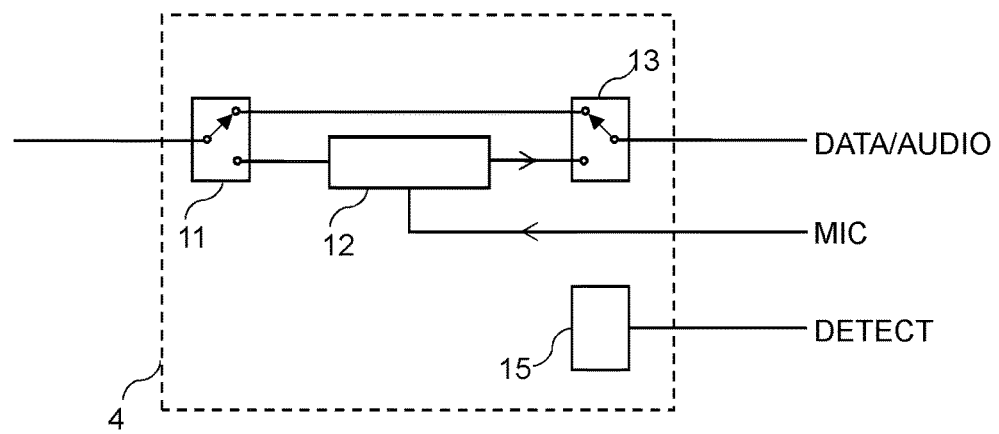
FIG. 2 is a schematic illustration showing the switching components and signal paths of the present invention.

FIG. 2 shows the headphone detection/output control module 4 comprising: data/audio switches 11, 13; audio processing components 12; and monitoring and control circuitry 15.

The data/audio switches 11, 13 allow RJU 1 to either: 1) pass data from the IFEC system directly to the headphones; or 2) process the IFEC data internally and pass analogue audio signals to the headphones.

Figure 3:
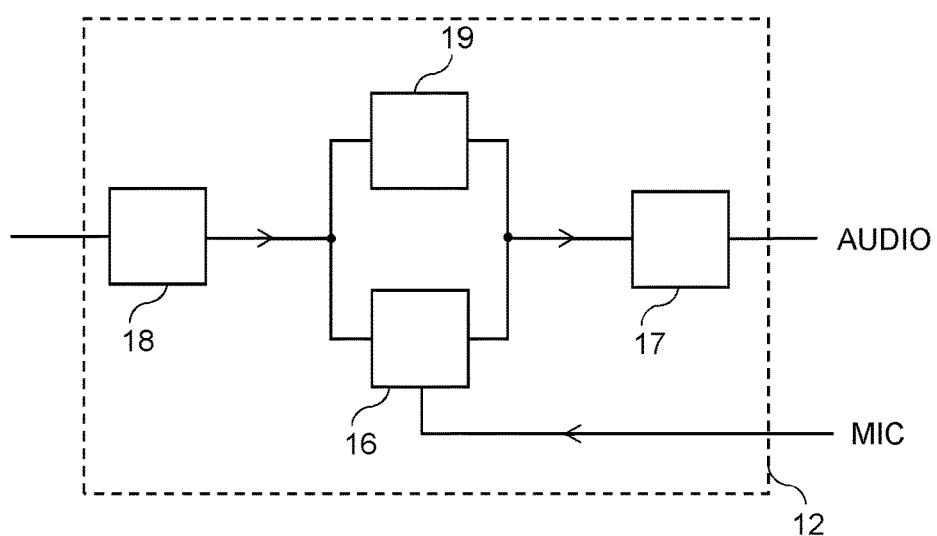
FIG. 3 is a block diagram of the audio processing components of the present invention.

FIG. 3 shows the audio processing components 12 of RJU 1, comprising: a Digital to Analogue Converter (DAC) 18; audio switch 19; noise-cancelling circuitry 16; and headphone amplifier 17.

DAC 18 is enabled when headphone detection/output control module 4 detects a headphone that requires analogue audio signals is connected. The DAC 18 establishes a data connection with the IFEC system, receives digital audio data, and then outputs analogue audio signals. These audio signals are passed to the headphone amplifier 17 via audio switch 19 and/or via the noise-cancelling circuitry 16. This noise-cancelling circuitry 16 is enabled when headphone detection/output control module 4 detects that a headphone that supplies microphone signals is connected. Multiple noise-cancelling circuits may be implemented, with selection based on the detected headphone. The combined audio signals from the DAC and noise-cancelling circuitry are then passed through the headphone amplifier 17 to the passenger's headphones.

Figure 4:
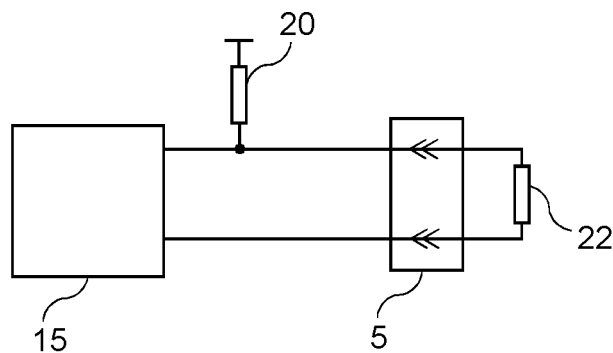
FIG. 4 is a schematic illustration of the headphone detection circuit, using an embedded headphone component, of the present invention.

As illustrated in FIG. 4, detection of the headphone type may be achieved by detecting a component embedded in the headphone or the headphone wiring with reference to one or more internal components 20 of RJU 1. One or more embedded components 22 in the headphone or headphone wiring are detected by monitoring and control circuitry 15 when the headphones 6 are attached to headphone connector 5.

Typically, the internal and embedded detection components 20, 22 will be precision resistors. When a headphone 6 is connected, internal resistors 20 and headphone embedded resistors 22 form a voltage divider, allowing the monitoring and control circuitry 15 to detect the embedded resistor values. The attached headphone type is then defined by comparing the detected and published values.

Advantageously, this detection scheme allows for the detection of multiple types of similar headphones. This is particularly useful for non-powered active noise-cancelling headphones, for which different noise-control systems may be required.

Figure 6:
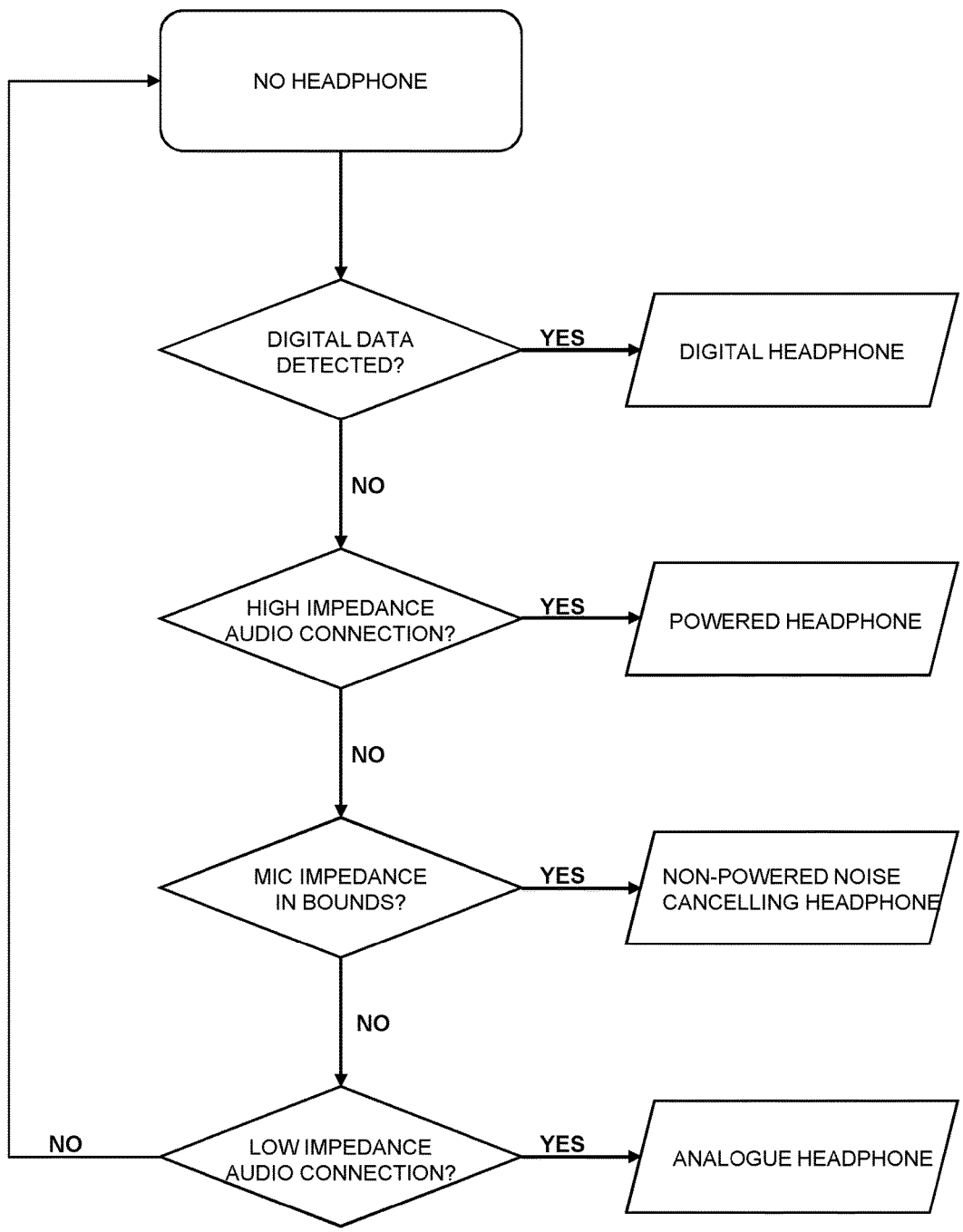
FIG. 6 is a flow chart of the audio/data line detection logic of the present invention.

Alternatively, headphone detection/output control module 4 may detect headphone type based solely on the audio and data connections to the headphone. FIG. 6 shows a flow chart of the detection process. If digital signals are seen on the data lines, a digital headset is detected to be connected. If not, the impedance of the audio lines is measured, with high impedance indicating a powered noise-cancelling headphone is connected. If not, the impedance of the microphone lines is measured, with an impedance within published bounds indicating a non-powered active noise-cancelling headphone is connected. If not, the impedance of the audio lines is measured, with low impedance indicating a conventional analogue headphone is connected.

Based on the detected headphone type, the monitoring and control circuitry 15 will perform the following steps: 1) set the data/audio switches 11, 13, 19; 2) enable or disable the required noise-cancelling circuitry 16; and 3) enable or disable the headphone power supply 3 as required.

FIGS. 5A, 5B, 5C, and 5D show the connections enabled on the headphone connector 5 when various headphone types are connected. The audio connections represent left and right analogue signals, together with an audio return path. The power connections represent positive and negative power lines. The mic connections represent left and right analogue microphone signals, together with a microphone return path. The data connections represent one or more digital data lines, typically configured as a differential pair of signals. The detect connections are one or more signal lines required when using components embedded in the headphone or headphone wiring to detect the headphone type.

Figure 5A:
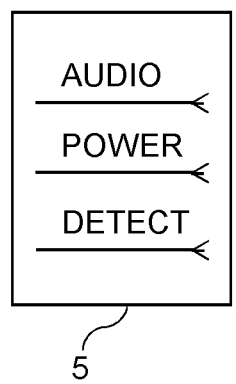
FIGS. 5A, 5B, 5C, and 5D show connections for four classes of headphone that may be used with the present invention.

FIG. 5A shows the connections enabled when a powered noise-cancelling headphone, such as would conventionally use ARINC Type C1 or C2 connectors, is detected. The jack headphone connector 5 will output 12V power and analogue audio signals.

Figure 5B:
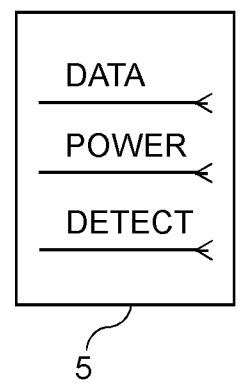

FIG. 5B shows the connections enabled when a digital headset, such as would conventionally use USB connectors, is detected. The jack headphone connector 5 will output 5V power and pass digital data from the IFEC system to the headphone.

Figure 5C:
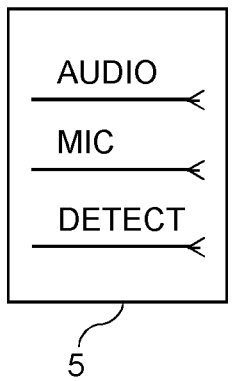

FIG. 5C shows the connections enabled when a noise-cancelling headphone, such as would conventionally use ARINC Type D1, D2 or D3 connectors, is detected. The jack headphone connector 5 will output analogue audio signals to the headphone, while receiving analogue microphone signals from the headphone.

Figure 5D:
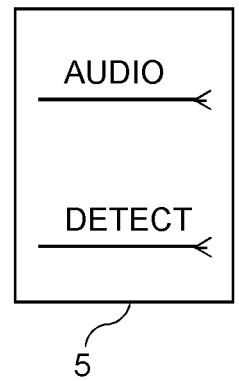

FIG. 5D shows the connections enabled when a standard analogue headphone, such as would conventionally use ARINC A1/B1 or A2/B2 connectors, is detected. The jack headphone connector 5 will output analogue audio signals.

Advantageously, the jack of the present invention allows all four headphone classes shown in FIGS. 5A, 5B, 5C, and 5D to connect using a single type of connector.

In choosing a connector to use as the jack headphone connector 5, various considerations must be made regarding issues such as connector size and robustness. As shown in FIG. 7, in one non-limiting embodiment a USB-C connector is proposed.

When using a USB-C connector, the following pin assignments are recommended: 1) headphone power supply using VBUS and GND pins; 2) data and audio signals multiplexed using the D+ and D− pins; 3) microphone signals using the RX+ and RX− pins; 4) audio return using the SBU1 and SBU2 pins; and 5) detect signals using CC1 and CC2 pins.

By carefully selecting the resistances embedded in the headphone detection lines, and using both CC1 and CC2 pins, the RJU can safely detect all supported headphones, while maintaining the ability to detect standard USB devices. This pin configuration also allows the RJU to detect standard headsets configured for USB audio accessory mode, and provide analogue audio as required.

Headphone detection/output control module 4 may also incorporate a firewall that controls the ability of a connected digital headphone to interface with the IFEC server system for the purpose of sending and receiving digital data between the digital headphone and said server system, as well as to monitor incoming and outgoing digital data/apply a set of predetermined security rules.

The firewall initially establishes a barrier between the IFEC server system and the connected digital headphone, which is assumed not to be secure or trusted prior to said rules being applied. The firewall allows only trusted digital devices to operate with the IFEC server system. This is achieved by firstly identifying the connected digital headphone, whether via a unique identifier, such as a product descriptor, serial number, security key, MAC address, or combination thereof, which is ascertained upon enumeration or connection with the connector or the connected IFEC system host. Additional rules are then exercised to ensure the integrity of the connection, and this may be performed by analysing data passing in either direction between the connected digital headphone and RJU 1, as well as examining how the connected digital headphone responds to certain modes of interrogation.

The invention claimed is:

1. A Remote Jack Unit (RJU) operative to connect both analogue and digital earphone devices to an aircraft In-Flight Entertainment and Communications (IFEC) server system providing a digital audio output, the RJU comprising:
   an interface for connecting an earphone device to the server system;
   a power supply for providing power to an earphone device when connected via the interface; and
   a control module comprising:
      a noise-cancellation module for providing noise-cancellation features to an earphone device when connected via the interface;
      a detector for detecting a type of noise-cancelling arrangement to be implemented for the earphone device connected via the interface;
      a converter for generating an analogue audio signal from the digital audio output received from the server system; and
      a switch for switching between providing digital and analogue signals to the attached earphone device via the interface;
   wherein the detector is configured to:
      detect digital data on a data line indicative of a digital earphone device being connected to the RJU;
      detect a high impedance on an audio line indicative of a powered noise-cancelling earphone device being connected to the RJU;
      measure the impedance on a microphone line to determine whether the impendence on the microphone line is indicative of a non-powered active noise-cancelling earphone being connected to the RJU; and
      detect a low impedance on an audio line indicative of a conventional analogue earphone device being connected to the RJU; and
   wherein the control module is configured to:
      supply digital signals to a connected earphone device when a digital earphone device is detected;
      supply analogue audio signals to a connected earphone device when an analogue earphone device is detected;
      connect the power supply to a connected earphone device when an earphone device requiring power is detected and to adjust the power supplied to the connected earphone device to suit the detected type of noise-cancelling arrangement; and
      enable the noise-cancellation module when a non-powered active noise-cancelling earphone device is detected.

2. An RJU according to claim 1, wherein the interface comprises a single connector operative to handle a plurality of signals.

3. An RJU according to claim 2, wherein the connector is configured to provide two or more of the following signals: analogue audio; digital audio data; power; microphone input signal; earphone detection signal.

4. An RJU according to claim 1, wherein the control module is configured to implement a plurality of different noise-cancelling arrangements and the control module is configured to implement a respective noise cancelling arrangement of the plurality of different noise-cancelling arrangements based upon the detected type of earphone device.

5. An RJU according to claim 1, wherein the control module further comprises a network security module operative to allow only trusted digital earphone devices to connect with the IFEC server system.

6. An RJU according to claim 1, wherein the control module is configured to detect a digital headphone connected to the interface and supply the digital headphone with 5V power and digital data from the IFEC server system.

7. An RJU according to claim 1, wherein the control module is configured to detect an analogue powered noise-cancelling headphone of a type associated with an ARINC Type C1 or C2 connector and supply the analogue powered noise-cancelling headphone with 12V power and analogue audio signals.

8. An RJU according to claim 1, wherein the control module is configured to detect an analogue non-powered noise-cancelling headphone of a type associated with an ARINC Type D1, D2 or D3 connector and supply the analogue non-powered noise-cancelling headphone with analogue audio signals while receiving analogue microphone signals from the analogue non-powered noise-cancelling headphone.

9. An RJU according to claim 1, wherein the control module is configured to detect a standard analogue headphone of a type associated with an ARINC A1/B1 or A2/B2 connector and supply the standard analogue headphone with analogue audio signals.

10. An In-Flight Entertainment and Communications (IFEC) system comprising an RJU in accordance with claim 1.

* * * * *